March 16, 1926.  
A. DE VELASCO  
DIRECTION INDICATOR  
Filed May 3, 1923  
1,577,113  
2 Sheets-Sheet 1
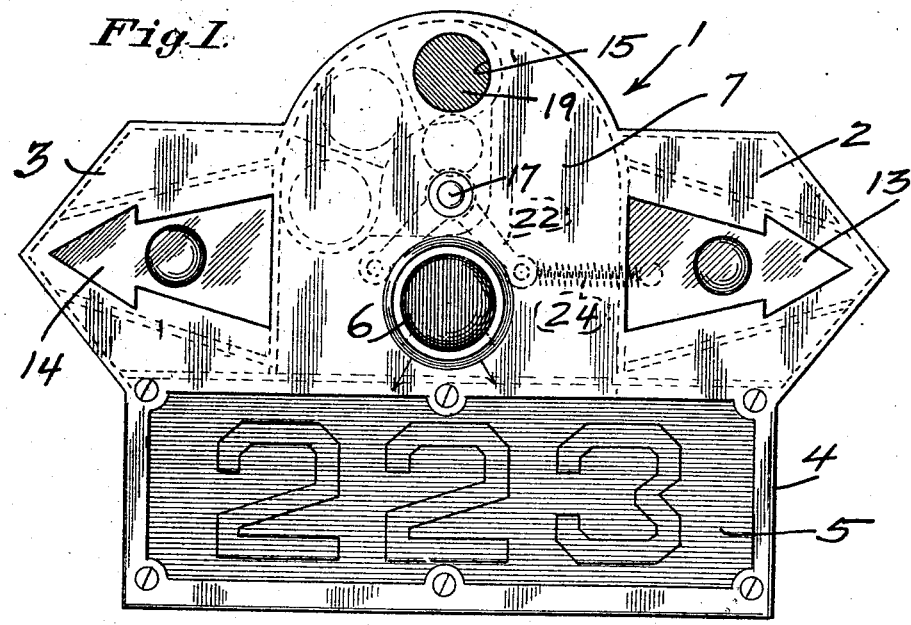
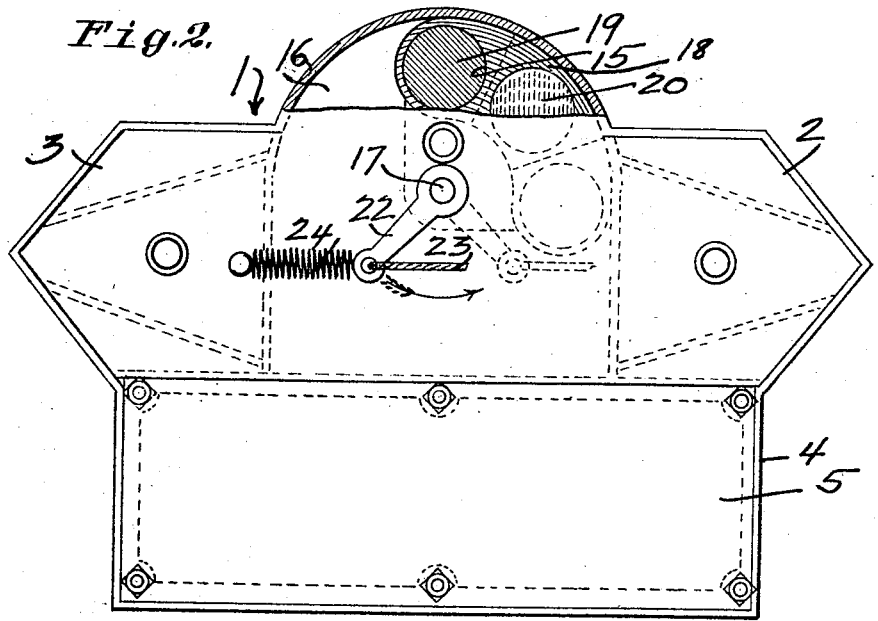
INVENTOR.
Angel de Velasco
BY
ATTORNEYS.

March 16, 1926.
A. DE VELASCO
DIRECTION INDICATOR
Filed May 3, 1923
1,577,113
2 Sheets-Sheet 2
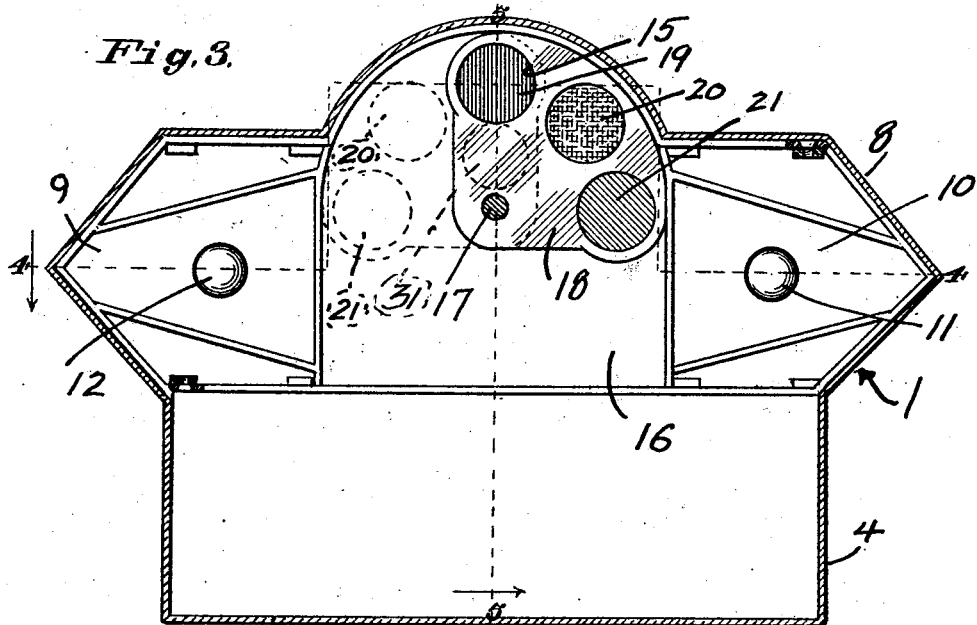
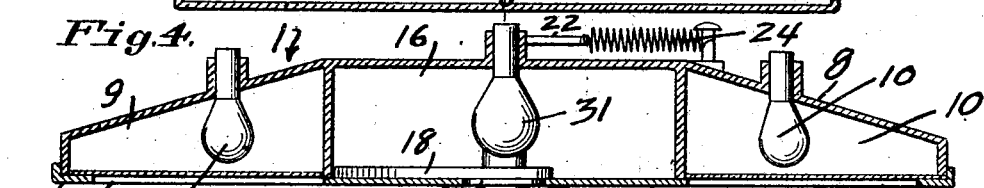
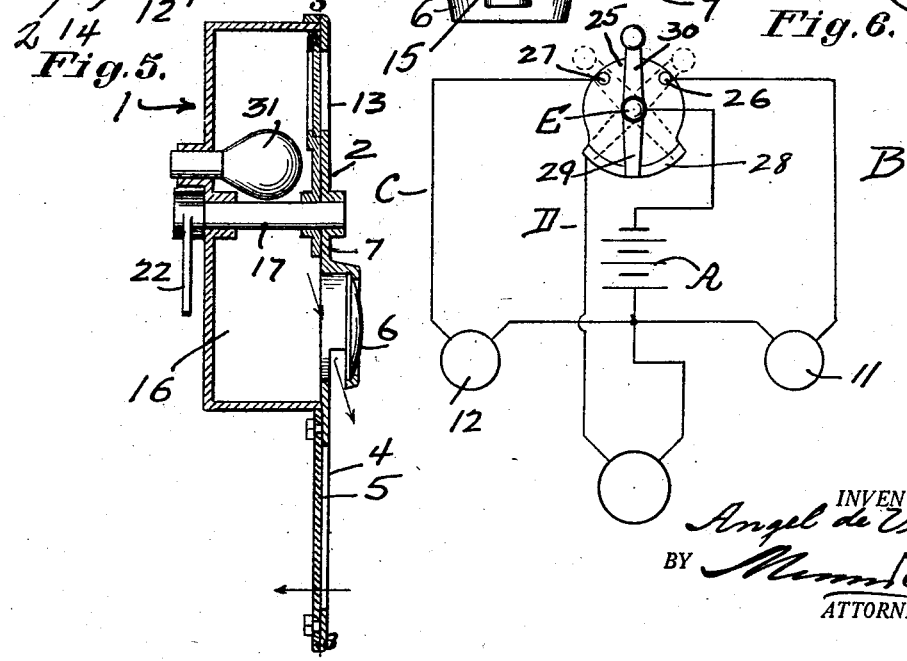
INVENTOR
Angel de Velasco
BY
ATTORNEYS Patented Mar. 16, 1926.

1,577,113

UNITED STATES PATENT OFFICE.

ANGEL DE VELASCO, OF SAN FRANCISCO, CALIFORNIA.

DIRECTION INDICATOR.

Application filed May 3, 1923. Serial No. 636,491.

*To all whom it may concern:*

Be it known that I, ANGEL DE VELASCO, a citizen of Cuba, and a resident of San Francisco, county of San Francisco, State of California, have invented a new and useful Direction Indicator, of which the following is a specification.

My invention relates in general to signals, and has reference more particularly to a direction indicator for motor vehicles for indicating to a following vehicle the direction to be taken by the vehicle in front, as well as to indicate approximately other maneuvers such as slowing up, proceeding ahead, or a stop.

The primary object of my invention is to provide an indicator of the class described which may be combined with the customary tail light and including a license plate holder, so that all of this necessary equipment may be combined in one fixture for use on the rear of a vehicle without disturbing the ornamental appearance of the vehicle, but on the other hand improving the appearance of the vehicle due to the ornamental features of the design which makes up the assembly.

The preferred embodiment of the invention is illustrated in the accompanying drawings, in which Figure 1 is a view in front elevation of the device; Figure 2 is a rear elevation of the device partly broken away to show inside construction; Figure 3 is a vertical section on the line 3—3, Figure 5; Figure 4 is a cross-section on the line 4—4 Figure 3; Figure 5 is a vertical section on the line 5—5 Figure 3; and Figure 6 is a detail view of the wiring diagram.

Referring now to the drawings in detail, I prefer to construct a device in a one-piece assembly, that is to say, I propose to use a box (1) which is shaped to meet the requirements of the device such as including outwardly projecting pointing side pieces (2) and (3) which merge into a license plate bracket (4) along the bottom of the box so that the license plate (5) may be carried and prominently displayed both in the day time and at night. To meet the requirements of the law made and provided for the operation of motor vehicles, I have equipped the device with the customary tail light (6) which is illuminated by a light bulb in circuit with the existing lighting fixtures for the vehicle. This circuit has nothing to do with the electrical means for operating my indicator, but for economy as well as appearance sake I have simply incorporated the tail light in the assembly.

The box (1) is made with a front (7) and a back (8). The back is hollow and makes up the major part of the box, leaving the front practically a plate which interlocks with the open edge of the box-like back. The box is divided into several compartments, such for instance as a compartment (9) for the right hand side of the device and a compartment (10) for the left hand side of the device. These compartments provide light housings for the lights (11) and (12) and the front is cut out over these light housings in the form of arrows (13) and (14) to provide, when selectively illuminated, direction indicators for signalling either a right hand turn or a left hand turn.

The central part of the box is made up practically in one large compartment and houses the tail light above referred to and the mechanism for indicating maneuvers other than those indicated by the right hand and left hand turn arrows (13) and (14).

Many direction indicators have been devised to indicate right and left hand turns and also a stop, but I propose to carry the idea further so as to give the vehicle approaching the rear of another vehicle complete command of all maneuvers being executed and to be executed by the vehicle in front, so that the driver of the approaching vehicle will know exactly what to expect. This signalling feature includes a series of lights, each light indicating a certain maneuver, for instance a slow down, a stop, or a movement ahead. To accomplish this indication I propose to use a light opening (15) positioned in the front of the box, preferably over the upper middle part of the central compartment (16). The central compartment (16) is illuminated so that a light will shine through the opening (15). Mounted on the spindle (17) in the center of the central compartment (16) is a semi-circular shield-like plate (18), the same being formed so that it may be oscillated from one half of the compartment to the other when the spindle (17) is turned. Arranged in the plate (18) are openings (19) (20) and (21) each having a screen or shaded plate across the same, and each screen having its own particular color, such for instance as green for the plate (19), yellow for the plate (20) and red for the plate (21).

The normal position for the openings will be as best shown in Figure 3 wherein the green shade is presented across the opening (15) indicating an advancing movement or rather a full ahead. As the operator of the vehicle which carries the indicating device pushes the foot brake forward, the plate (18) will be oscillated so as to progressively advance the yellow screen across the opening (15), showing a yellow light indicating a slowing up movement. When the foot brake is pressed all the way in so as to bring the vehicle to a stop the plate (18) will be further advanced to show a red color through the opening (15) indicating a stop. The lights, as will thus be seen, are arranged to progressively indicate colors corresponding to a full ahead, slow down, and stop, through the opening (15).

The actuating mechanism for realizing the above described functions preferably comprises an arm or lever (22) fixed to the spindle (17) and a cord, cable or the like, (23) connected to the end of the arm or lever (22) and in turn connected to the foot brake pedal so that when the pedal is actuated a pull will be imposed on the cable (23) pulling the arm (22) as shown in dotted lines in Figure 2 to progressively move the shaded screens across the opening (15). In one sense of the word the indications for the full ahead, slow down and stop are automatic. The light which illuminates the colored screens is constantly burning. A spring (24) connects the end of the arm or lever (22) so as to return the plate (18) to its normal position showing green through the opening (15).

By referring to Figure 6 a suitable wiring diagram is illustrated for manipulating all of the direction indicating lights. A switch (25) may be positioned on the instrument board of the vehicle or on the steering wheel or even the steering post or any other convenient place, the same having a contact at (26), another contact at (27) and a constant contact at (28). The contact at (26) controls the light (11) for indicating the right hand turn and the contact at (27) controls the light (12) for indicating the left hand turn. Since the light for illuminating the opening (15) should be constantly on, the contact (28) will always be in wiping relation to the end (29) of the switch lever (30) so that when the switch lever (30) is turned to close the contact (26) to illuminate the light (11) it will not disturb the illumination of the light for the opening (15). The same applies when the switch lever is turned to the contact (27) for illuminating the light (12). In the circuit shown in this figure, A is the battery, B the wiring for the light (11), and C the wiring for the light (12). The wiring for the third light is indicated as at D and the ground for the complete circuit shown as at E.

The lights (11) and (12) for the left hand and right hand turns are selective.

It may be found that a single light such as (31) will sufficiently illuminate the central compartment (16) so as to serve for both the opening (15) and the tail light (6). However, if two lights are required the second light may be positioned right in back of the tail light.

I claim:

An indicating device for use in connection with the box of right and left turn signalling devices of a vehicle signalling mechanism comprising a tail light compartment whose lamp is disposed between the signalling devices, the compartment having an opening disposed above the tail lamp, a transversely disposed shaft journaled in the opposite front and rear walls of the compartment and having at one end a crank disposed exteriorly of the compartment, a sector shaped plate in said compartment behind the opening and rigidly connected to the shaft, an arcuate series of dissimilarly colored transparent disks carried by the plate for separate coaction with said opening, a spring connected to the crank for holding the shaft so that normally one of the disks registers with the said opening, and a brake pedal actuated means connected to the crank for moving the plate against the action of the spring so that various adjustments of the brake pedal when operated by the foot of the driver will adjust the plate into different positions with respect to the opening to display different colors therethrough.

ANGEL de VELASCO.